No. 778,826. PATENTED DEC. 27, 1904.
J. R. HILL & J. A. SVENSSON.
TRANSFER PRESS.
APPLICATION FILED MAY 26, 1904.

Witnesses
Eugene M Sliney
H. H. Robinette

Inventors
John R. Hill,
John A. Svensson
by Louis A. Hill Attorney

No. 778,826. PATENTED DEC. 27, 1904.
J. R. HILL & J. A. SVENSSON.
TRANSFER PRESS.
APPLICATION FILED MAY 26, 1904.
12 SHEETS—SHEET 4.
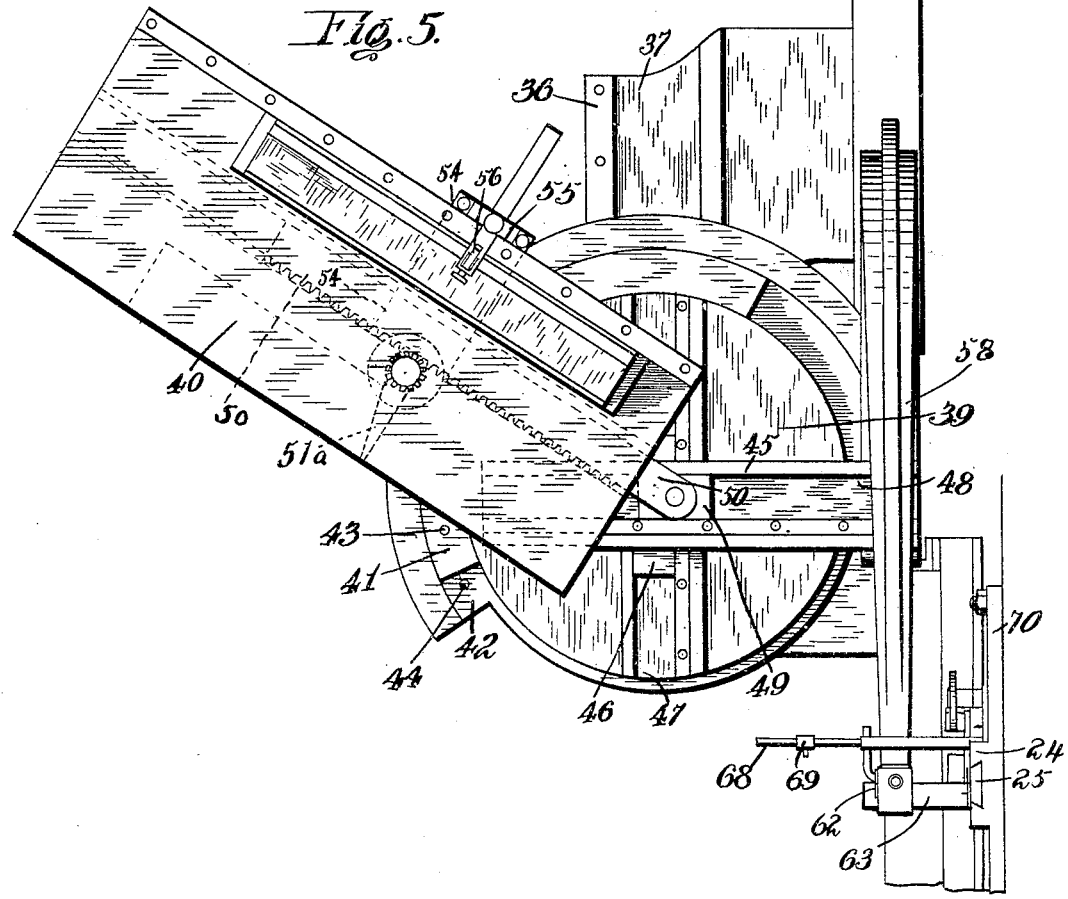
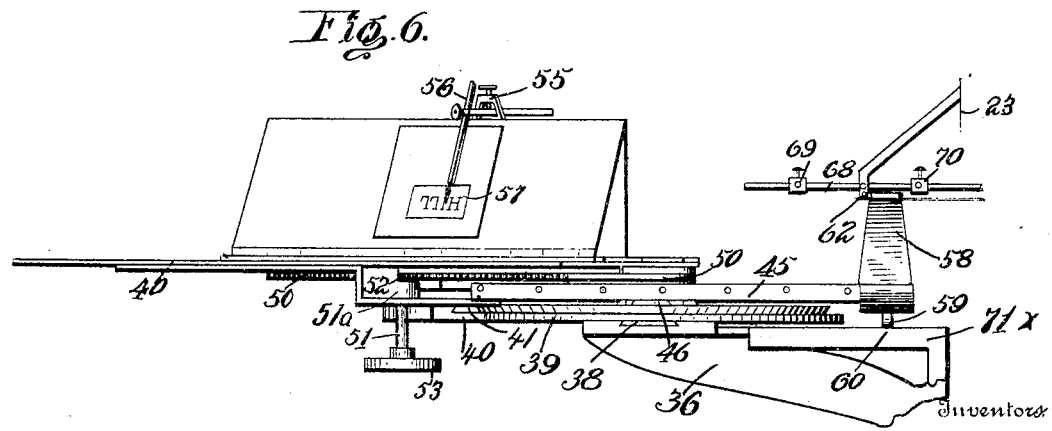
Witnesses
Eugene M Sliney
J A Robinette
Inventors
John R. Hill,
John A. Svensson,
By Louis A Hill
Attorney

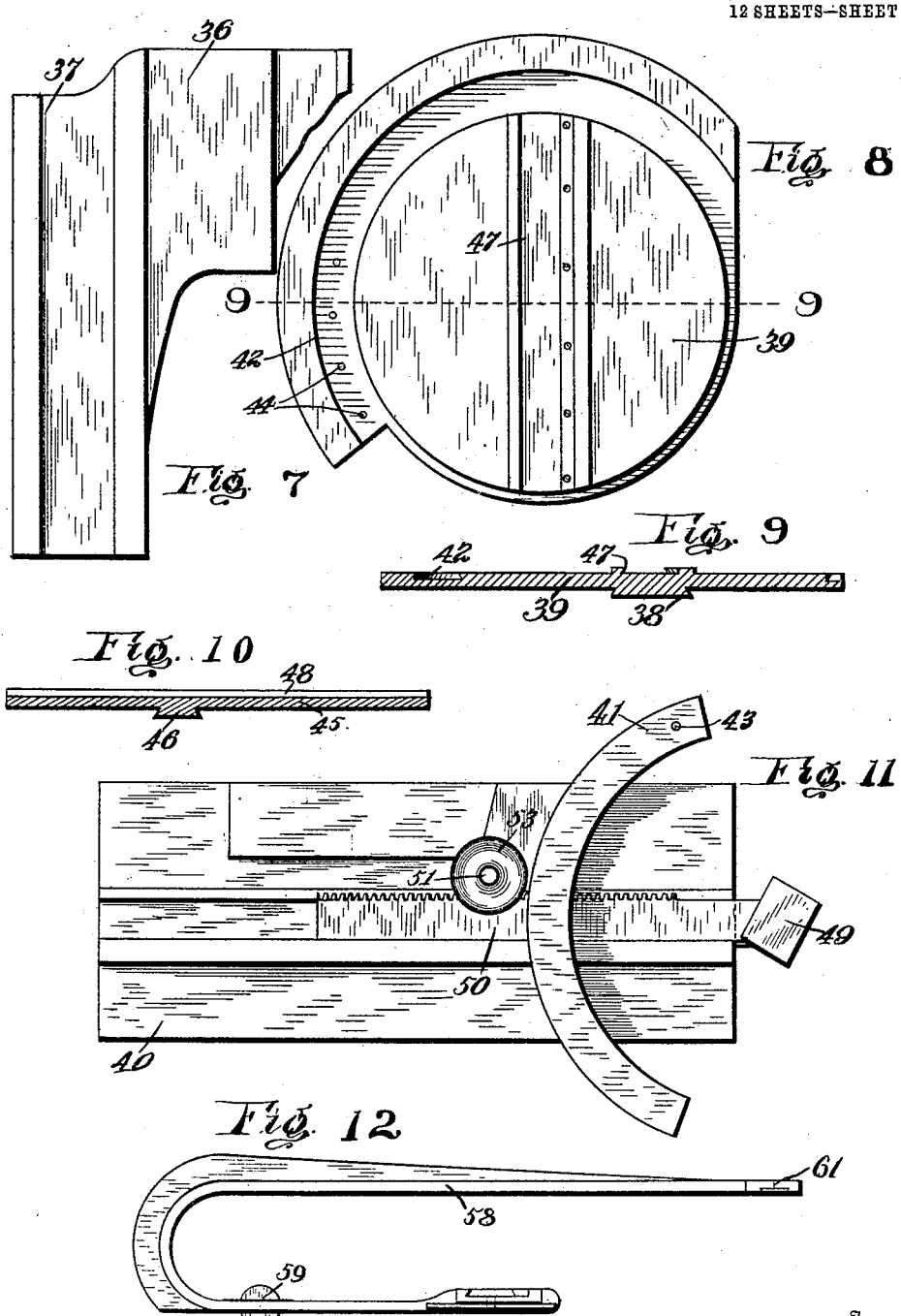

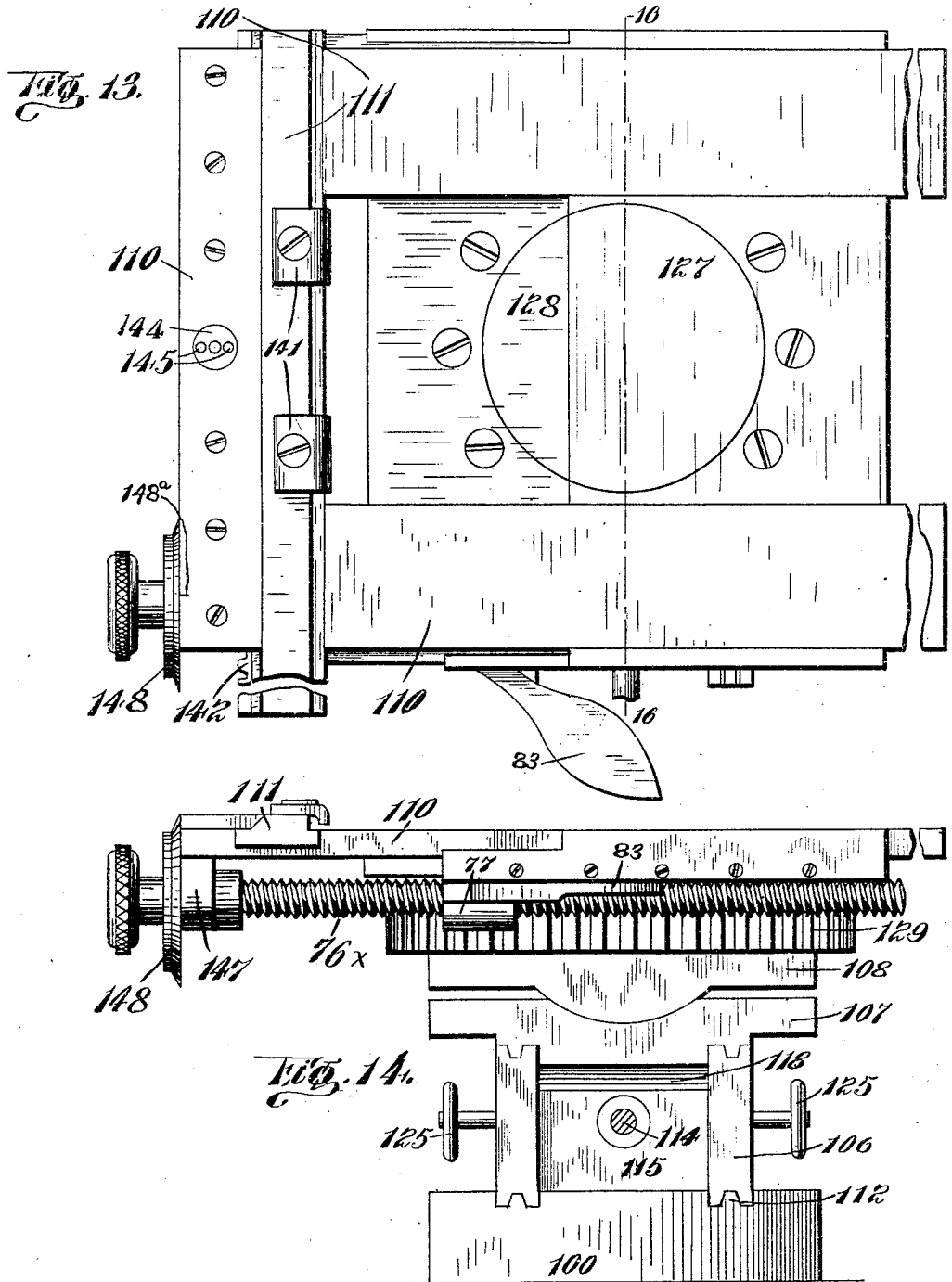

No. 778,826. PATENTED DEC. 27, 1904.
J. R. HILL & J. A. SVENSSON.
TRANSFER PRESS.
APPLICATION FILED MAY 26, 1904.
12 SHEETS—SHEET 7.
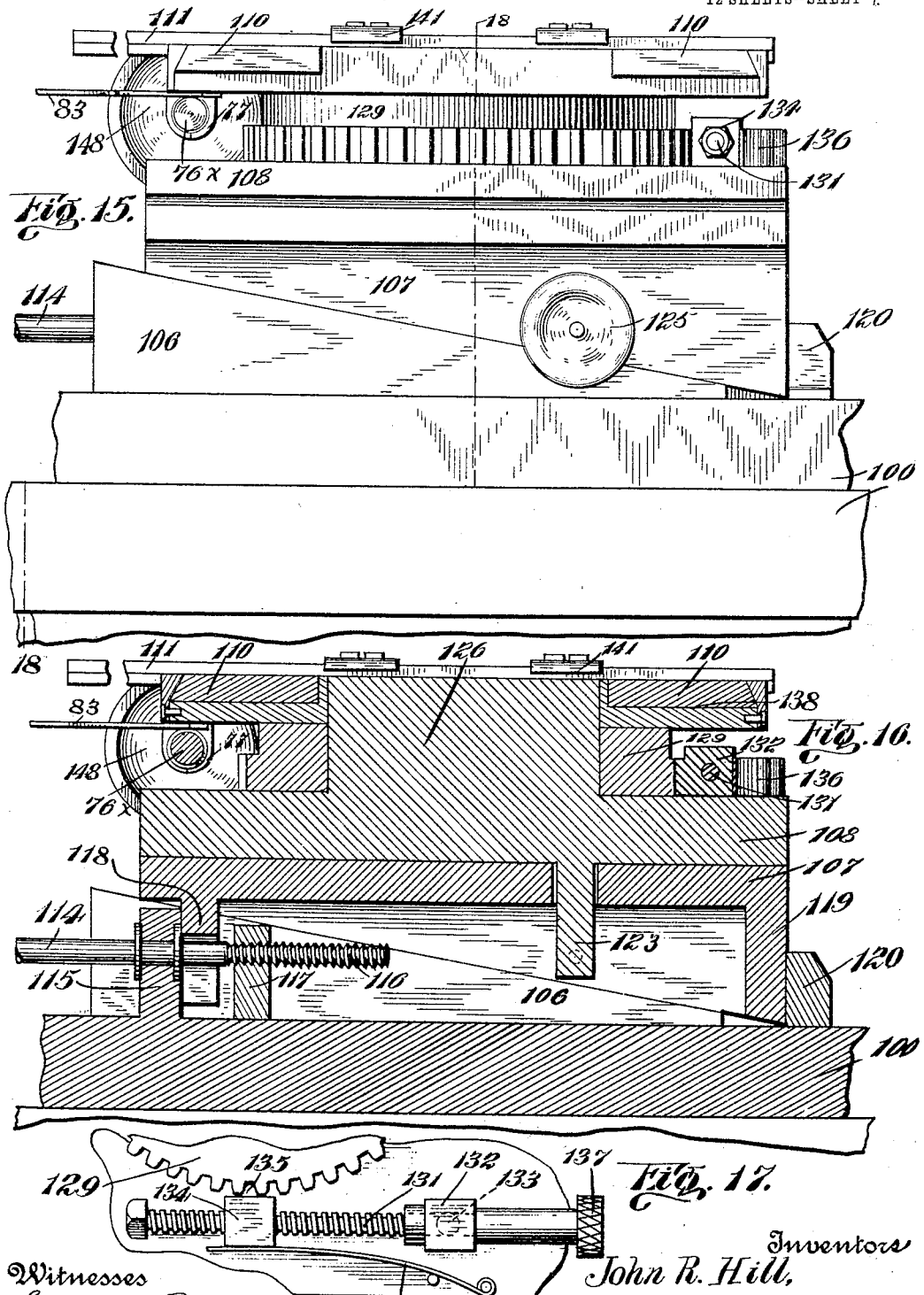

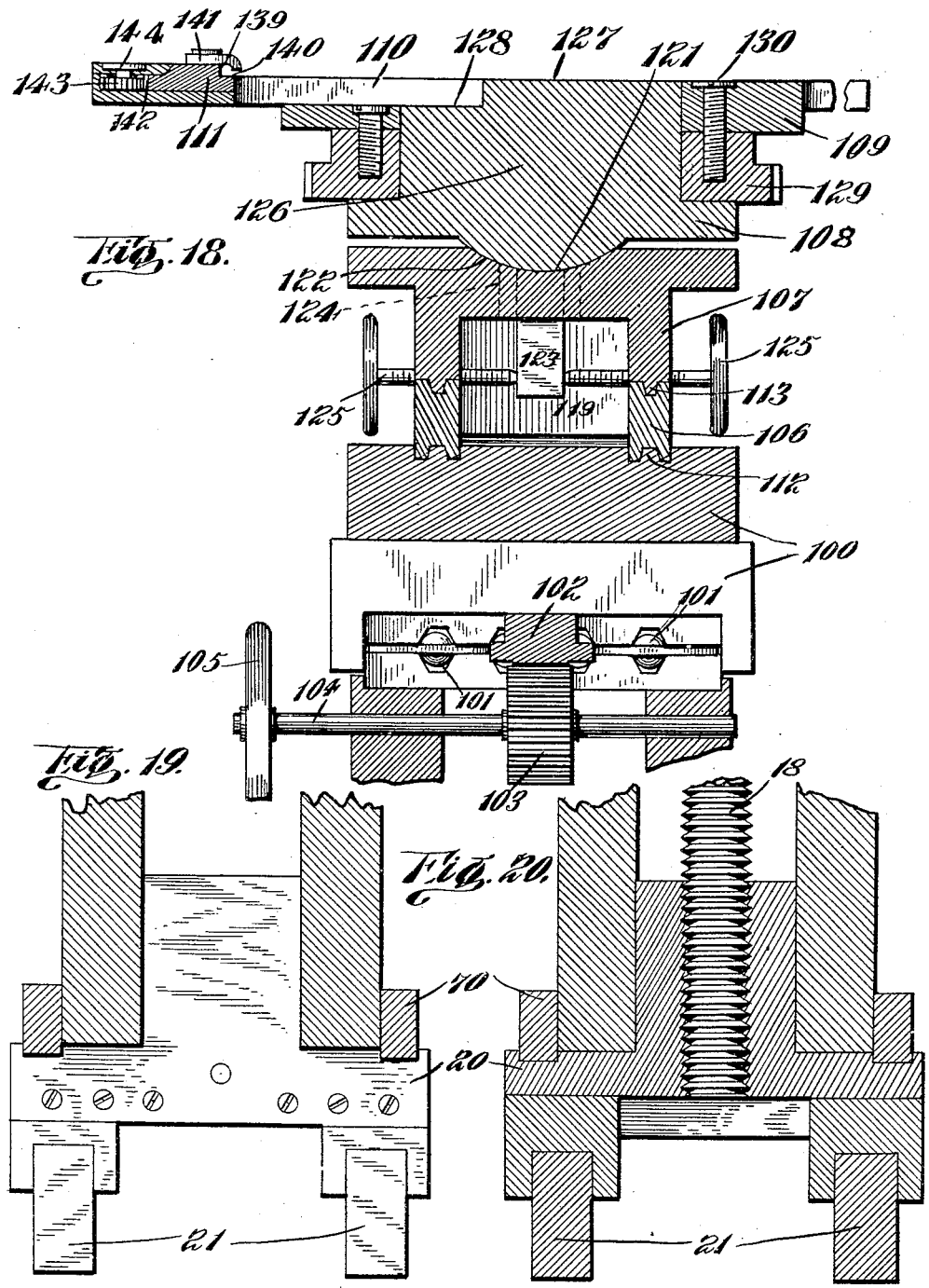

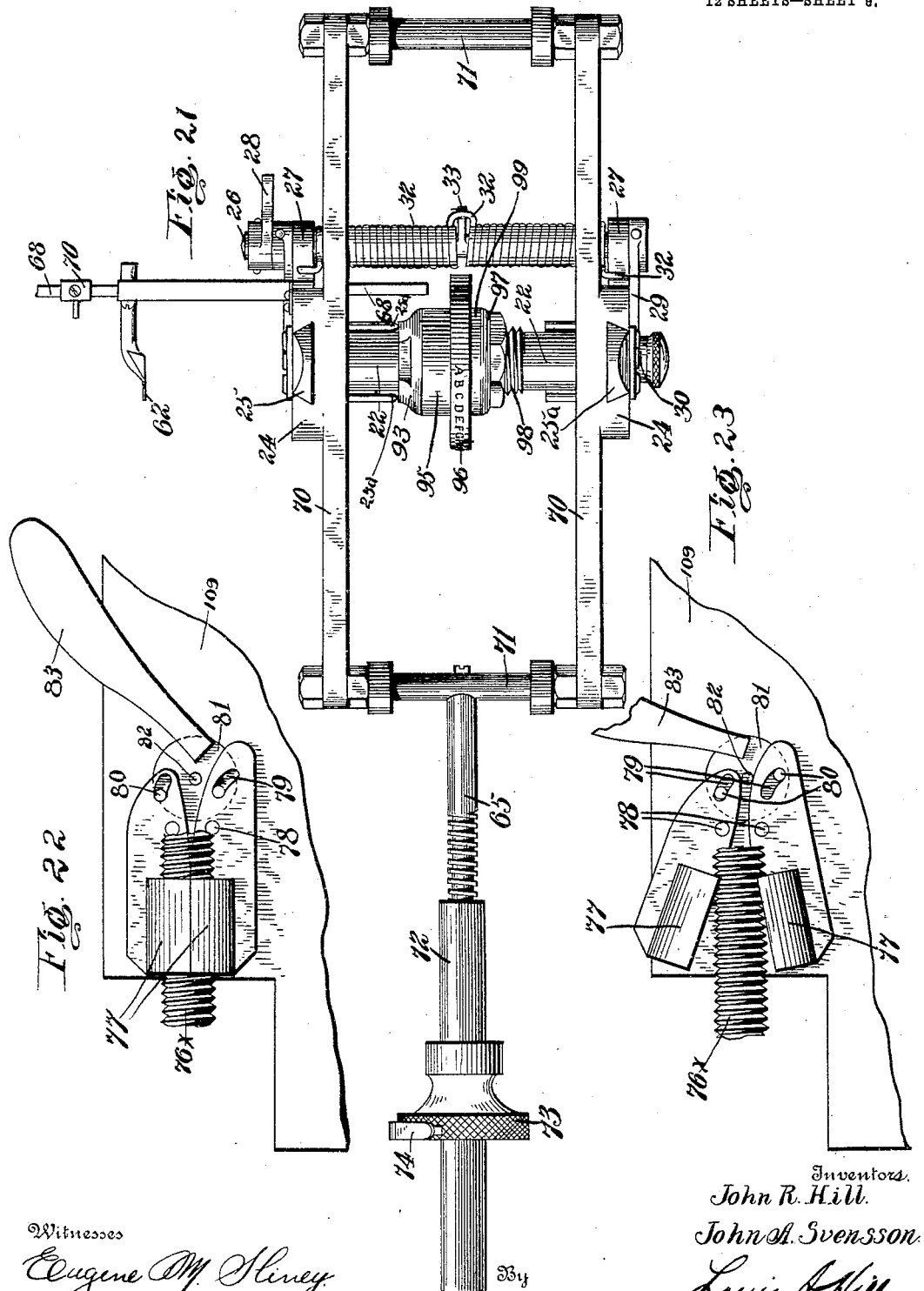

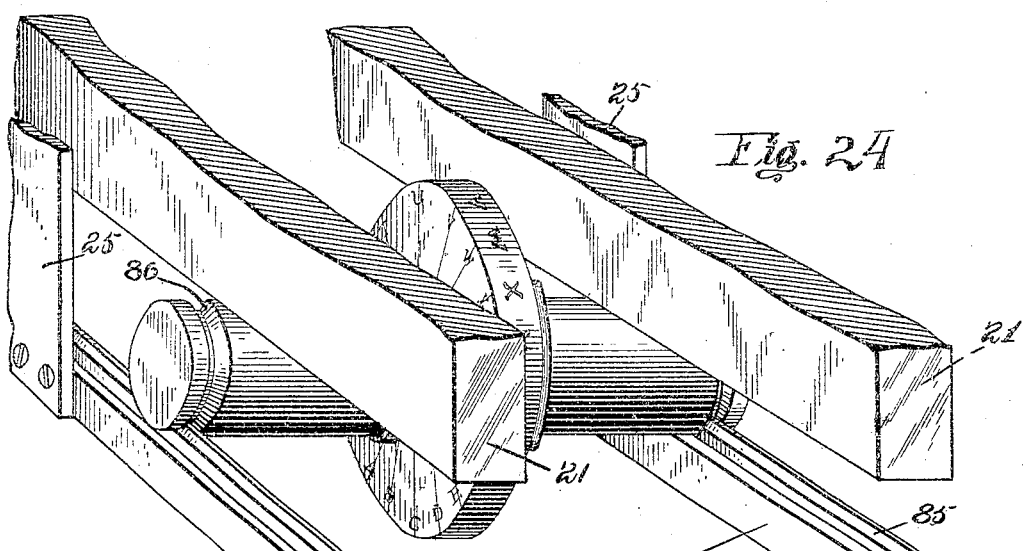

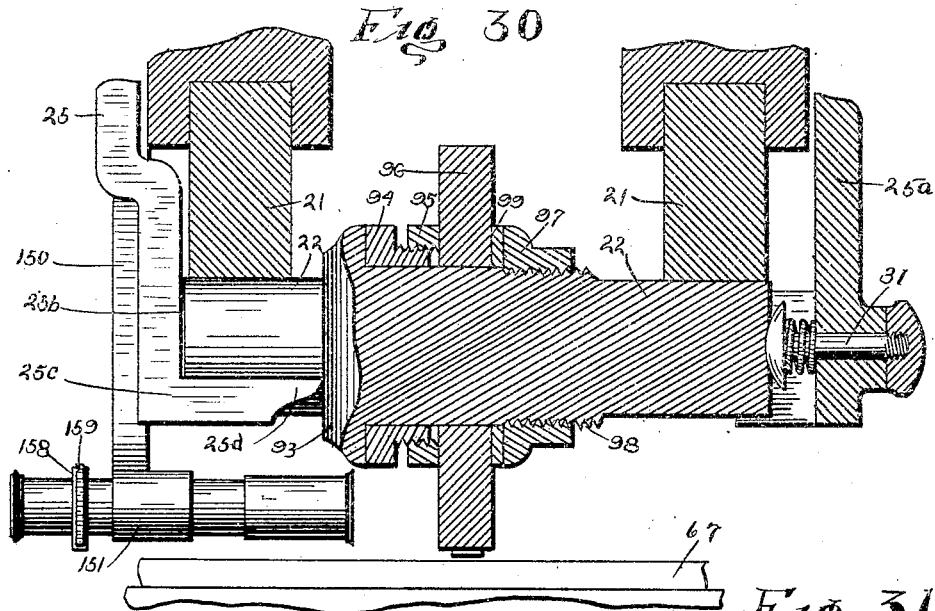
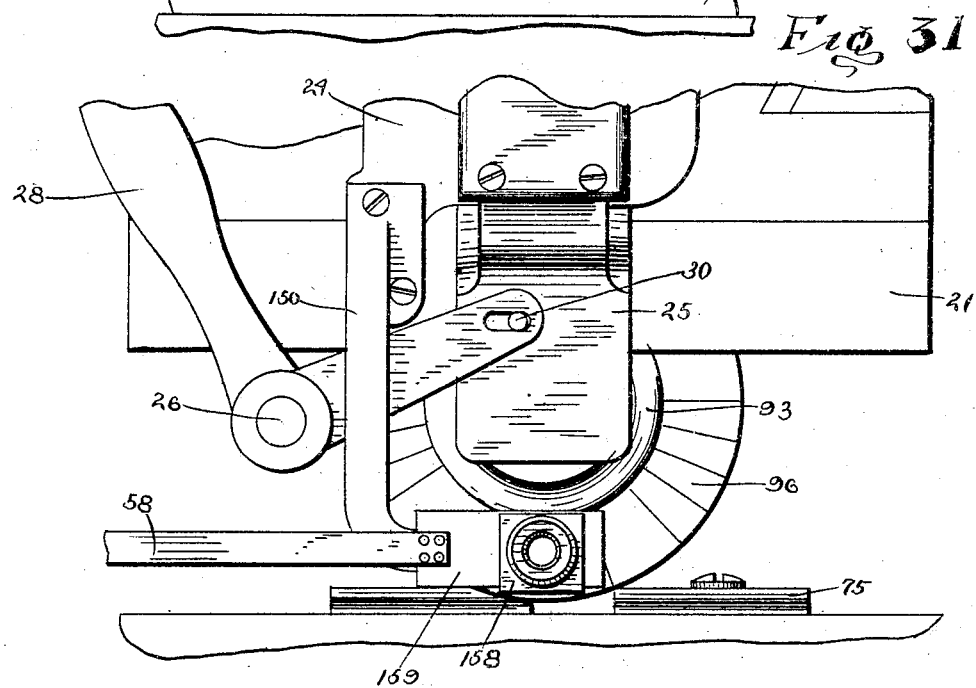

No. 778,826. PATENTED DEC. 27, 1904.
J. R. HILL & J. A. SVENSSON.
TRANSFER PRESS.
APPLICATION FILED MAY 26, 1904.
12 SHEETS—SHEET 12.
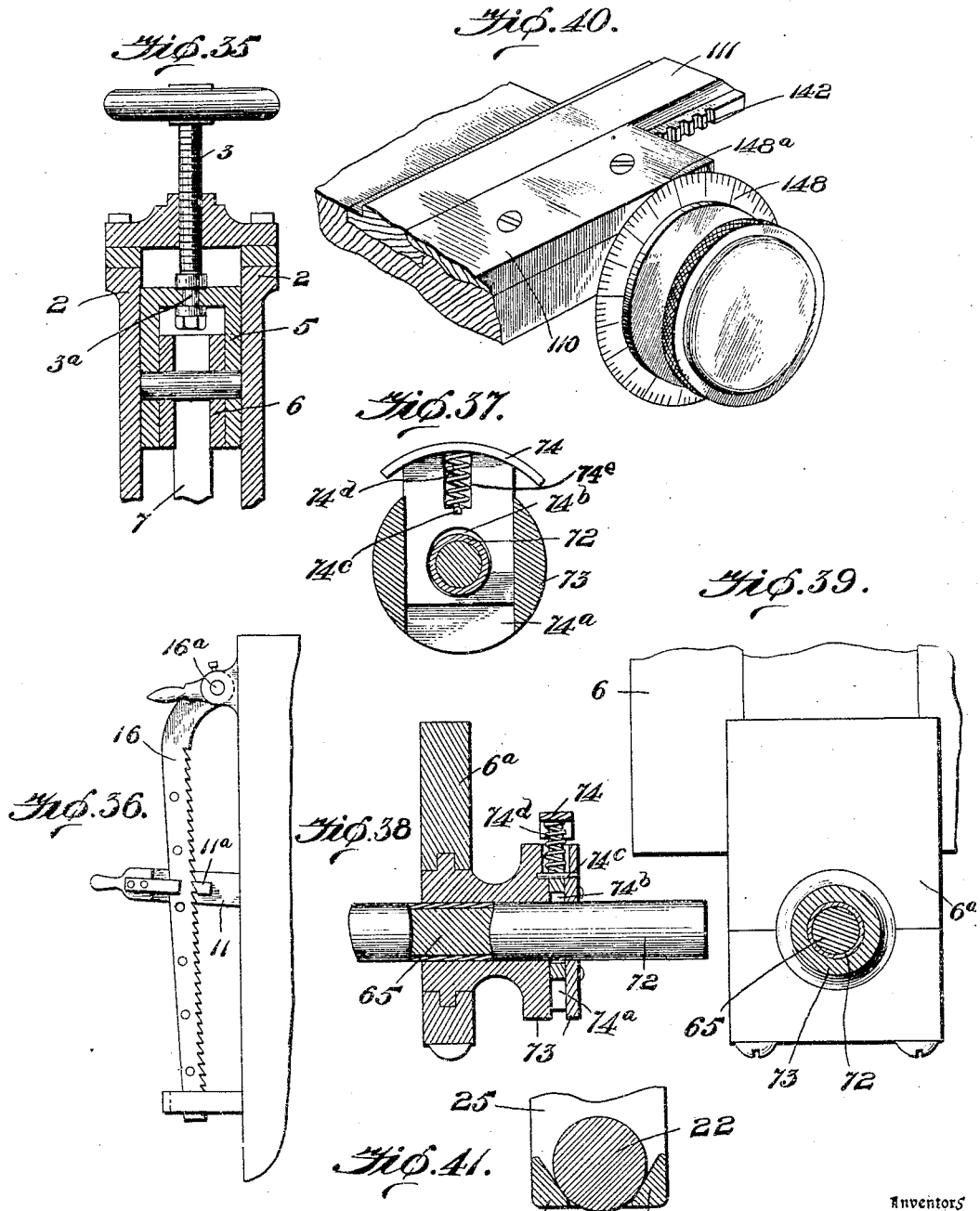
Witnesses
E. L. Horn
B. M. Offutt
Inventors
John R. Hill &
John A. Svensson
By G. Ayres
Attorney No. 778,826.                                   Patented December 27, 1904.

UNITED STATES PATENT OFFICE.

JOHN R. HILL, OF WASHINGTON, DISTRICT OF COLUMBIA, AND JOHN A. SVENSSON, OF FORT HANCOCK, NEW JERSEY; SAID SVENSSON ASSIGNOR TO SAID HILL.

TRANSFER-PRESS.

SPECIFICATION forming part of Letters Patent No. 778,826, dated December 27, 1904.

Application filed May 26, 1904. Serial No. 209,954.

*To all whom it may concern:*

Be it known that we, JOHN R. HILL, residing at Washington, District of Columbia, and JOHN A. SVENSSON, residing at Fort Hancock, New Jersey, citizens of the United States, have invented certain new and useful Improvements in Transfer-Presses, of which the following is a specification.

Our invention relates to improvements in transfer-presses; and it consists in the constructions, combinations, and arrangements herein described and claimed.

The objects of our invention are to provide improved means for providing metallic blanks with letters, characters, or designs by the transfer process for producing printing-plates, such as are employed in printing bank-notes, &c., in an expedient and convenient manner, whereby the labor now expended in the production of such plates is greatly curtailed, with a corresponding increase in the capacity of the operator.

A further object of our invention is to provide means for producing printing-plates which will obviate the necessity of engraving an initial plate and preparing a separate transfer-roll for each different combination or arrangement of letters or other characters.

A further object of our invention is to provide means whereby all combinations and arrangements of characters can be accurately transferred to printing-plates by the employment of a limited number of stock transfer-rolls, thus overcoming the necessity of manufacturing a separate transfer-roll for each different group or arrangement of characters.

In the accompanying drawings, forming a part of this application, and in which similar reference-symbols indicate corresponding parts in the several views, Figure 1 is a side elevation illustrating one embodiment of our invention. Fig. 2 is a plan view of the construction shown in Fig. 1. Fig. 3 is a detail elevation, on a larger scale, showing a transfer-roll positioned in the press together with its coöperative parts. Fig. 4 is an axial sectional view showing in detail the transfer-roll and its supporting means. Fig. 5 is a plan view, on a larger scale, illustrating our preferred form of adjustable proportional-spacing means. Fig. 6 is a front elevation of the construction illustrated in Fig. 5. Fig. 7 is a detail plan view of the supporting-bracket for the adjustable proportional-spacing mechanism. Fig. 8 is a detail plan view of a disk-carrying member of the adjustable proportional-spacing mechanism. Fig. 9 is a section on the line 9 9 of Fig. 8. Fig. 10 is a longitudinal section of a slide member of the spacing mechanism. Fig. 11 is a top plan view of the pattern-carrying angularly-adjustable member of the proportional-spacing mechanism, together with a rack slidably mounted thereon and pivotally supporting a slide-block. Fig. 12 is a detail side elevation of the pointer-arm of the adjustable spacing mechanism, which is rigidly secured to the slide member. Fig. 13 is a plan view, on a larger scale, showing a chuck for holding the printing-plate to be operated upon. Fig. 14 is an end elevation of the construction illustrated in Fig. 13. Fig. 15 is a side elevation of the construction shown in Fig. 13. Fig. 16 is a sectional view on the line 16 16 of Fig. 13. Fig. 17 is a detail plan view, on a larger scale, illustrating the adjustable pawl mechanism employed in the work-chuck. Fig. 18 is a sectional view on the line 18 18 of Fig. 15. Fig. 19 is a detail sectional view, on a larger scale, taken on the line 19 19 of Fig. 1. Fig. 20 is a detail sectional view, on a larger scale, taken on the line 20 20 of Figs. 1, with part omitted for clearness. Fig. 21 is a detail plan view, on a larger scale, of the roll-carrying saddle and its attached parts. Fig. 22 is a detail view, on an enlarged scale, showing a disengaging-nut employed on the work-chuck in its engaging position. Fig. 23 is a similar view showing the nut in disengaged position. Fig. 24 is a detail perspective view illustrating a modified means for positioning the transfer-roll in the press. Fig. 25 is a detail longitudinal sectional view through the middle of one of the guide-rails shown in Fig. 24. Fig. 26 is a sectional view taken on the line 26 26 of Fig. 25. Fig. 27 is a detail sectional view illustrating a modification of the guide-rail shown in Fig. 24. Fig. 28 is a detail sectional view illustrating a further modified form of guide-rail. Fig. 29 is a detail sectional view illustrating a form of guide-rails adapted for use with a roll-arbor having tapered ends. Fig. 30 is an axial sectional view similar to Fig. 4, illustrating a modified construction. Fig. 31 is an end elevation of the part shown in Fig. 30. Fig. 32 is a detail elevation showing our preferred construction of transfer-roll. Fig. 33 is a longitudinal sectional view of the index-reading device shown in Figs. 30 and 31. Fig. 34 is a detail view showing the two index-glasses employed in the reading device of Fig. 33. Fig. 35 is a detail transverse sectional view through the trunnion-block 5 and upper portions of the stanchions 2. Fig. 36 is a detail side elevation of the forward part of the press-frame, clearly showing the rack 16 pivotally suspended therefrom and the lug 11$^a$ on the side lever 11. Fig. 37 is a transverse sectional view through the knurled thumb-wheel 73, showing the construction and arrangement of the spring-clip carried thereby. Fig. 38 is a longitudinal view of the parts shown in Fig. 37. Fig. 39 is a sectional elevation through the reduced portion of the hub of the knurled thumb-wheel 73. Fig. 40 is a detail perspective view clearly illustrating the arrangement of the vernier-wheel 148 and the index-mark 148$^a$, and Fig. 41 is a transverse sectional view through the roll-spindle and the supporting-lugs for the same.

Referring to the drawings, 1 indicates a press-frame provided with stanchions 2, through the top of which is threaded an adjusting-screw 3, carrying a hand-wheel 4. The lower end of the adjusting-screw 3 is swiveled at 3$^a$ in a trunnion-block 5, mounted for vertical movement on the stanchions. A beam 6, journaled on the trunnions of said block 5, is shown provided with a downwardly-extended portion 7, which carries a contact-plate 8 in position to be engaged by a cam 9, secure on the shaft 10.

An operating-lever 11 is secured to the shaft 10 and provided with a handle 12 in convenient position for actuation by the operator. A bell-crank lever has its arm 13 suitably weighted at 15 to press its arm 14 against the downward extension 7 with sufficient force to maintain the contact-plate 8 in engagement with the cam 9. A rack 16 is freely suspended from its upper end at 16$^a$ on the forward part of the press-frame in position to engage a pawl or lug 11$^a$ on the lever 11 and acts as a gravity-latch to lock said lever in its depressed position. The rack 16 is shown provided with a series of apertures 17, adapted to receive a pin or stop for limiting the downward swing of the lever 11, and thereby insure a uniform impression of the several characters.

It will be clear from the above description that when the lever 11 is depressed by the operator the cam 9 will engage the extended portion 7 of the beam 6 and swing said beam sufficiently on the trunnion-block 5 to bring the transfer-roll into operative engagement with the printing-plate being operated upon.

A clamping-screw 18, having a hand-wheel 19, provides means for clamping the bearer-head 20 in any desired position along the beam 6. Any suitable bearers 21 are adjustably carried by the bearer-head in position to engage the arbors 22 of the transfer-roll in the usual manner.

Slidably supported on the bearer-head 20 is a saddle 23, which comprises two slide-bars 70, suitably connected by cross-braces 71. A feed-screw 65 is shown suitably secured to one of said cross-braces and having its threaded portion engaged by an internally-threaded sleeve 72, surrounding the same. The sleeve 72 is slidably supported in a knurled thumb-wheel 73, which latter is rotatably supported in a bracket 6$^a$ on the forward end of the beam 6. As shown arranged in Figs. 37, 38, and 39, a spring-clip 74 is slidably mounted in a recess 74$^a$ in the thumb-wheel 73 and provided with an aperture 74$^b$, encircling the sleeve 72 and somewhat larger than the periphery of said sleeve. A pin 74$^c$ extends across the recess 74$^a$ and is constructed to be engaged by the clip 74 to limit its upward movement to a position in which the aperture 74$^b$ is out of engagement from the inclosed sleeve 72. A spring 74$^d$, positioned in a slot 74$^e$ in the clip, is confined within said clip and pin for normally maintaining the clip in its upward position, with its aperture 74$^b$ out of engagement with the sleeve 72. The clip 74 is carried by the thumb-wheel 73 in convenient position to be depressed by the operator when grasping said wheel and is constructed in its depressed position to engage the sleeve 72 and to lock said sleeve and thumb-wheel rigidly together. This provides a convenient means for roughly adjusting the saddle 23 on its supporting bearer-head by grasping the sleeve 72 and sliding said sleeve, together with its inclosed feed-screw 65, through the thumb-wheel 73 and for obtaining a final close adjustment of the saddle by depressing the spring-clip 74 of the thumb-wheel 73 and rotating the threaded sleeve 72 by turning said thumb-wheel.

A spindle 26, rotatably supported in bearings 27 on the saddle, is provided with an operating-handle 28 and with two slotted crank-arms 29, engaging pins 30 on the two roll-supports 25 and 25$^a$, which latter are slidably supported in guideways 24 on the saddle. A spring 32, engaging the spindle-bearings and a lug 33 on said spindle, tends to maintain the roll-supports in their upper position, and thereby hold the transfer-roll arbor properly against the bearers 21. The roll-support 25 is provided with supporting-lugs 25ᵇ and 25ᶜ, formed with inclined faces adapted to receive and support one end of the roll-arbor, as shown in Figs. 30 and 41. Positioning-stops 25ᵈ are shown extending from the supporting-lugs in position to engage the shoulder 93 on the roll-arbor for insuring proper positioning of the transfer-roll when placed in the press. The roll-support 25ᵃ is provided with supporting-lugs 25ᵇ and 25ᶜ, similar to those carried by the support 25, and is also provided with a spring-pressed plug 31 in position to engage the roll-arbor 22 and yieldingly maintain the same in the desired position with its shoulder 93 engaging the stops 25ᵈ.

As shown especially in Figs. 3 and 32, the transfer-roll carries the alphabet or other suitable designs in relief on its periphery and is preferably provided with radial lines and guide-letters on one of its sides.

Referring especially to Fig. 18, 100 indicates any usual traveling press-bed slidably mounted on ball-bearings 101 and carrying a rack 102, arranged in mesh with a pinion 103, secured to the shaft 104 of the hand-wheel 105. The press-bed carries a universal work-chuck comprising two wedge-shaped members 106 and 107, a tiltable member 108, a rotatable member 109, a laterally-adjustable member 110, and a longitudinally-adjustable member 111, as clearly shown in Figs. 13, 14, 15, 16, 17, and 18. The actuating-wedge 106 is provided on its lower face with grooves for engaging guide-rails 112 on the press-bed and with other grooves on its upper surface for receiving guiding projections 113 on the wedge member 107. The actuating-spindle 114 is swiveled in a projection 115 on the press-bed and provided with a threaded portion 116, engaging a nut 117, carried by the wedge 106 for actuating or shifting the latter upon the rails 112 upon actuation of said spindle 114. The upper wedge member 107 is confined from longitudinal movement by its depending lugs 118 and 119, which engage, respectively, the projection 115 and a rear projection 120, carried by the press-bed. As clearly shown in Fig. 16, the lug 118 is forked to straddle the spindle 114. This construction provides a simple and convenient means for raising or lowering the wedge member 107 and its supported parts by operating the spindle 114. The lower surface of the tiltable member 108 is provided with a convex projection 121, which is supported in a similar depression 122 in the wedge member 107. A lug 123 on the tiltable member projects through a slot 124 in the wedge 107 and has its opposite sides engaged by adjusting-screws 125, which latter are threaded in the sides of the wedge 107 and provide means for tilting the member 108. The tiltable member is provided with an upwardly-extending cylindrical portion 126, which is formed with a stepped upper surface 127 and 128. The rotatable member 109 is rotatably supported on the cylindrical portion 126 and provided with a toothed wheel 129, which may be formed integral therewith or suitably secured thereto, as by bolts 130. A threaded spindle 131 is swiveled in a block 132, which is pivotally secured at 133 to the tiltable member. A nut 134, threaded on said spindle, is provided with a tooth 135, adapted to engage the toothed wheel 129, and a spring 136 is secured to the tiltable member in position to engage said nut for normally maintaining it in engagement with the toothed wheel. The spindle 131 is provided at its outer end with a knurled head 137, which can be actuated by the operator to swing said spindle about the pivotal point 133 of its supporting-block sufficiently to remove the tooth 135 of the nut from engagement with the wheel 129. This provides a ready means for the operator to manually adjust the rotatable member quickly through any desired angle by first disengaging the tooth 135 and then to complete the final close adjustment by actuating the threaded spindle 131 with its toothed nut in engagement with the wheel 129.

A laterally-adjustable U-shaped member 110 has its two legs slidably mounted in guideways 138 on the rotatable member 109, the parts being preferably so constructed that the upper surface of said legs lie in a common plane with the upper surface of the rotatable member 109 and of the cylindrical portion 126. The longitudinally-adjustable member 111 constitutes a work-holder slidably mounted in the laterally-adjustable member 110 and is provided with a guide-shoulder 139 for positioning the work and with a surface 140, which is arranged flush with and constitutes a practical continuation of the upper surfaces of the legs of said member 110. The member 111 is provided with clamps 141, adapted to clamp the work securely against the surface 140, and with a rack 142, meshing with a pinion 143, carried by the member 110 for longitudinally adjusting the member 111 thereon. A disk 144 is shown secured to the pinion-spindle and provided with holes 145 to receive a wrench for turning the pinion, the upper surface of said disk being shown flush with the face of the member 110.

Referring especially to Figs. 13, 14, 22, and 23, a screw 76ˣ is shown swiveled at 147 in the laterally-adjustable member 110 and carrying a vernier-wheel 148 in coöperative relation to an index-mark 148ᵃ on said member 110. Two threaded segments 77, pivotally supported at 78 on the rotatable member 109 of the work-chuck, are provided with slots 79, in which work two crank-pins 80, carried by a common disk crank 81, which latter is pivotally supported at 82 on the rotatable member and provided with an actuating-handle 83. In the operation of this device the operator manually shifts the handle 83 to throw the threaded segments 77 from engagement with the screw $76^\times$ and then grasps the laterally-adjustable member 110 and shifts the same readily to a rough approximation of its desired position. The operator then shifts the handle 83 to throw the threaded segments into engagement with the screw $76^\times$ and then completes the final close adjustment of the member 110 by rotating said screw. It will be obvious that the vernier-wheel 148, carried by the screw $76^\times$, provides a certain and reliable means for shifting the laterally-adjustable member 110 through any desired space.

A support 36 is shown rigidly secured to one of the stanchions 2 and provided on its upper face with an undercut channel 37, constructed to receive a dovetail projection 38 on the lower surface of the base member 39 for slidably supporting the latter on said support. An angle-bracket $71^\times$, carried by the press-bed 100, is rigidly secured to the base member 39 for reciprocating said member on the support 36 upon actuation of the press-bed. A pattern-carrying member 40 has secured thereto an annular guide 41, constructed to fit in an annular undercut channel 42 in the base member, the guide 41 being provided with an aperture 43 for receiving a locking-pin which can be brought into register with any of a series of apertures 44 in the base member to permit any desired angular adjustment of the pattern-carrying member relatively thereto. A slide member 45 is provided with a dovetail projection 46, constructed to slidably engage a similar channel 47 in the top surface of the base member, and with an undercut groove 48 in its upper surface adapted to receive a slide-block 49, which latter is pivotally supported on a rack 50, slidably supported on the pattern-carrying member. A pinion-spindle 51 is journaled in a wedge-shaped standard $51^a$, secured to the under surface of the pattern-carrying member 40, as most clearly shown in Figs. 5 and 6. The spindle 51 carries a pinion 52 in mesh with the rack 50 and is provided with a hand-wheel 53. A plate 54 is secured to the rack 50 and carries a standard 55 for supporting an index 56 in position to be shifted along a pattern 57 by the movement of the rack 50.

The pointer-arm 58 is adjustably secured to the inner end of the slide member 45 and is preferably provided with a supporting-roller 59 in position to travel on a track 60 during the movement of the pointer-arm and slide member. The free end of the pointer-arm is provided with an index-mark 61, adapted to be brought into registry with a pointer 62, which is adjustably supported on the roll-carrying saddle 23. A rod 68 is shown secured to the support of the pointer 62 and carrying adjustable holders 69 and 70, adapted to carry magnifying-glasses in position for accurately reading the registry of the pointer 62 and index-mark 64, with their corresponding lines. A pointer 63, carried by the pointer-arm 58, is provided with an index-mark 64 in such position that any desired radial guide-line on the side of the transfer-roll can be brought into registry therewith by properly rotating said roll in its supporting-slides.

In the operation of my invention the printing-plate for receiving the name or title is clamped to the member 111 of the work-chuck and a stock-transfer roll carrying the proper characters for the desired style and design of name or title is positioned in the supports 25 and $25^a$. A pattern comprising the desired characters in their required arrangement is then prepared of any convenient size and secured in any suitable manner upon the pattern-carrying member 40 of the adjustable proportional-spacing mechanism and the pattern-carrying member properly adjusted in the annular slot 42 to produce in the subsequent operation the desired relative proportion between the spacing of the characters on the printing-plate and such spacing in the pattern. The index 56 is then adjusted to the first character of the pattern, guiding-dots being preferably provided on the pattern (see especially Figs. 1 and 6) to permit accurate adjustment of the index 56 to each of the several characters. The screw 65 is then actuated to shift the saddle 23 sufficiently to bring the pointer 62 into registry with the index-mark 61 on the pointer-arm 58, and the chuck is then operated to bring the desired point in the printing-plate in position to receive the impression of the first character in the name or title.

As an alternative operation to the steps above described subsequent to placing the printing-plate and transfer-roll in the press such printing-plate and roll can be brought into relation to insure the impression of the first character of the name or title at the desired point on said plate by properly actuating the press-bed or work-chuck to suitably adjust said plate or by adjusting the roll-carrying saddle 23 by the screw 65, after which the pointer 62 and index-line 61 can be brought into registry by shifting the pointer-arm 58 through the medium of the rack and pinion 50 and 52. A pattern comprising the desired characters in their required arrangement is then secured to the pattern-carrying member in proper position to bring the first character of the name or title in registry with the index 56.

After either of the above-specified alternative series of steps has been performed the transfer-roll is rotated in its supports sufficiently to establish register between the index-mark 64 and the guide-line on the side of the roll corresponding to the first character of the desired name or title. The operator then depresses the lever 11 sufficiently to produce the required pressure of the periphery of the transfer-roll on the printing-plate 67, and the first character of the name or title is then rolled into the printing-plate 67 by reciprocating said plate under the transfer-roll in the usual manner, after which the operator raises the lever 11 to elevate the transfer-roll out of engagement with the printing-plate 67. The operator then actuates the hand-wheel 53 to shift the rack 50 sufficiently to bring the index 56 into registry with the second character of the pattern. Such shifting of the rack 50 will act through the block 49 to shift the slide member 45 and its attached pointer-arm 58 through a distance determined by the angular position in which the pattern-carrying member has been adjusted. This movement of the pointer-arm 58 will shift the index-mark 61 from registry with the pointer 62 the exact distance desired on the printing-plate 67 for the spacing between the first and second characters of the name or title, and the operator then shifts the bed 100 and its attached parts sufficiently to move the pointer-arm 58 until its index-mark 61 again registers with the pointer 62. It is obvious that instead of shifting the pointer-arm 58 the saddle 23 could be shifted to move the pointer 62 into registry with the index-mark 61. The transfer-roll is then rotated in its supports sufficiently to establish register between the index-mark 64 and the guide-line on the side of the roll corresponding to the second character of the desired name or title. The operator then depresses the lever 11 sufficiently to produce the required pressure of the periphery of the transfer-roll on the printing-plate 67, and the second character of the name or title is then rolled into the printing-plate 67 by reciprocating said plate under the transfer-roll in the usual manner, after which the operator raises the lever 11 to elevate the transfer-roll out of engagement with the printing-plate 67. The hand-wheel 53 is then actuated to shift the index 56 into registry with the third character of the name or title and the above-described steps repeated until the desired name or title has been produced in the printing-plate 67, which constitutes a secondary surface adapted to receive the desired name or title and to be subsequently employed for printing in the manner usual with such plates, either with or without previous hardening.

It will be obvious that instead of preparing a pattern of the desired characters in their required arrangement such pattern could comprise guide-marks or indices suitably spaced apart to correspond with the relative arrangement of the characters constituting the name or title.

It will further be clear that the transfer-roll constituting the primary surface could be provided with various partial or complete designs in relief on its periphery instead of with letters or other characters.

Figs. 24, 25, and 26 show a preferred form of guide-rail 84 carried by the supporting-slides 25, which may be employed as an alternative construction to the means shown in Figs. 3 and 4 for properly positioning the roll-arbors. The rails 84 are shown formed with beveled track portions 85, constructed to fit beveled recesses 86 in the roll-arbors and extending forwardly in convenient approximation to the front ends of the bearers 21, and are provided with upwardly-curved rear portions 87. In the employment of these guide-rails the operator shifts the handle 28 to lower the slide-supports 25 and their attached guide-rails and then places the roll-arbors on the depressed rails with their beveled recesses 86 in engagement with the track portions 85. The arbors are then rolled along the rails until their recesses are engaged by the upwardly-curved rear portions 87 of said rails, thereby insuring proper positioning of the roll, after which the handle 28 is released and the upward movement of the slide-supports 25 and their guide-rails will bring the roll-arbors firmly against the lower surfaces of the bearers 21.

Fig. 27 illustrates a modified construction in which the rear of the guide-rails are provided with depressed arc-shaped portions 88, into which the roll-arbors are adapted to drop, and thereby prevent accidental movement of said arbors from engagement with the rear portions of the rails.

Fig. 28 illustrates a further modification in which the roll-arbor is provided at one end with a recess 89, having one side beveled and the other formed radially, the track portion 90 of the guide-rail being correspondingly formed for engaging said recess.

Fig. 29 illustrates a construction in which both ends 91 of the roll-arbor are beveled and the track portions of the guide-rails formed with suitably-inclined surfaces 92 for engaging such beveled ends.

The above-described forms of guide-rails constitute satisfactory means for positioning the roll against the bearers 21, and it is obvious that numerous changes could be made in their forms and constructions within the spirit and scope of our invention.

Figure 1:
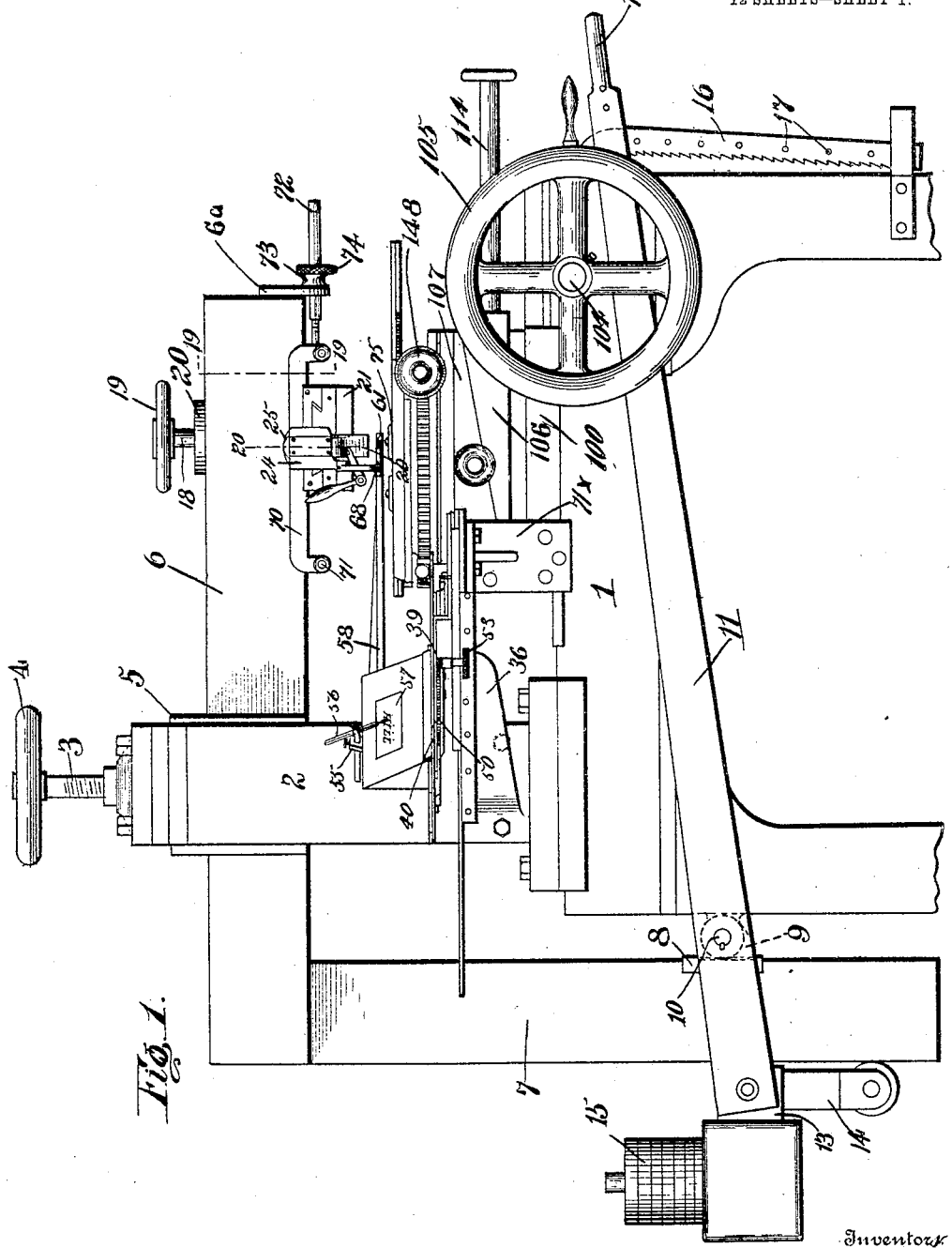
Figure 2:
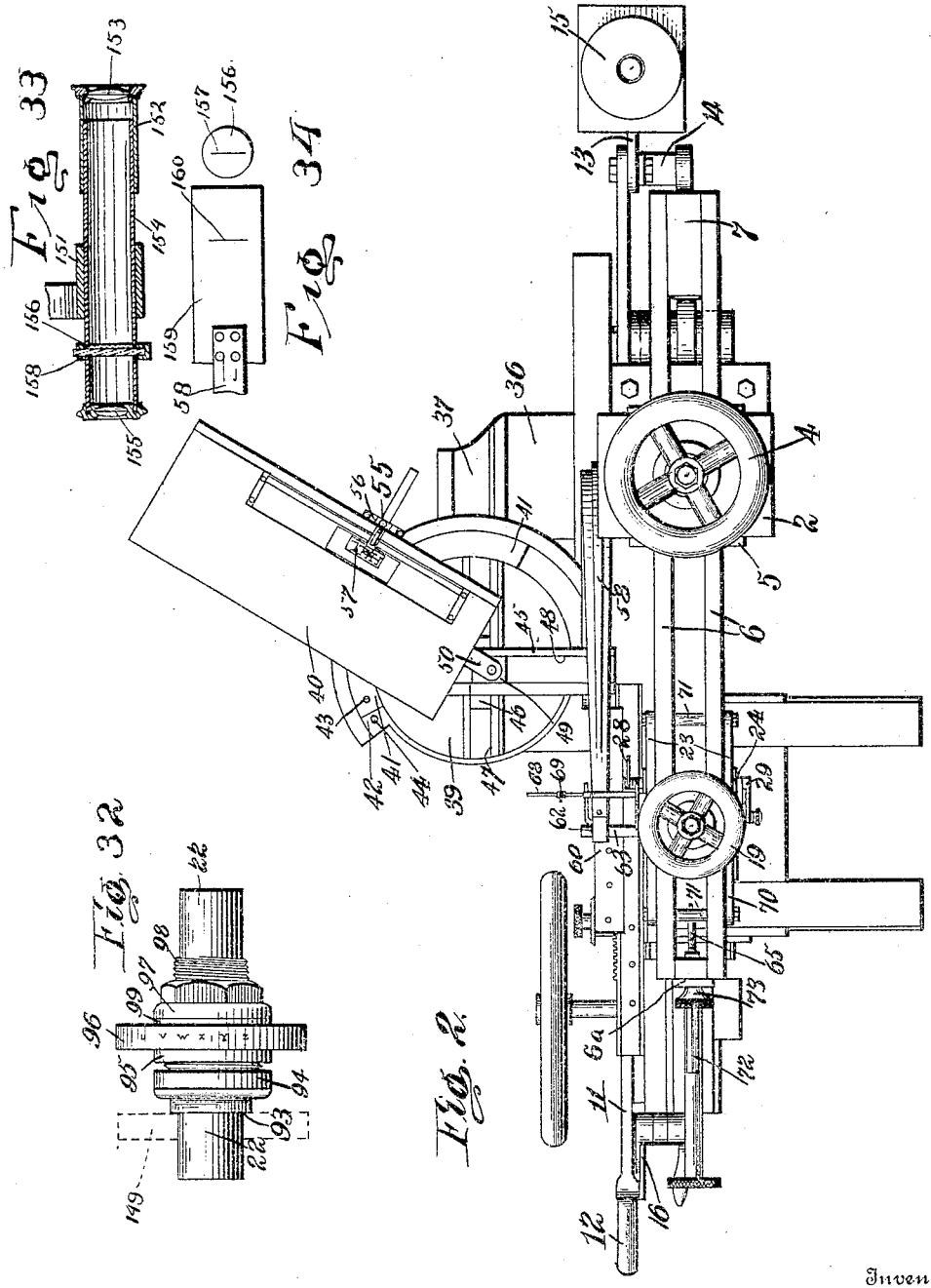
Figure 3:
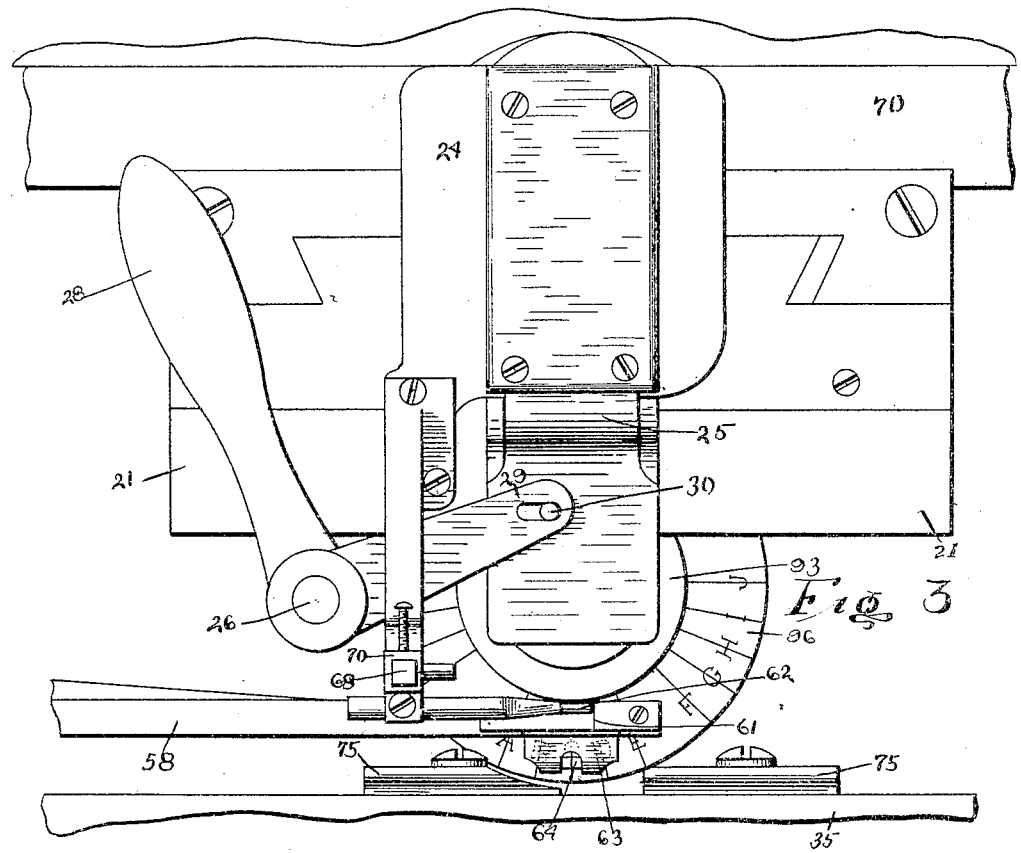
Figure 4:
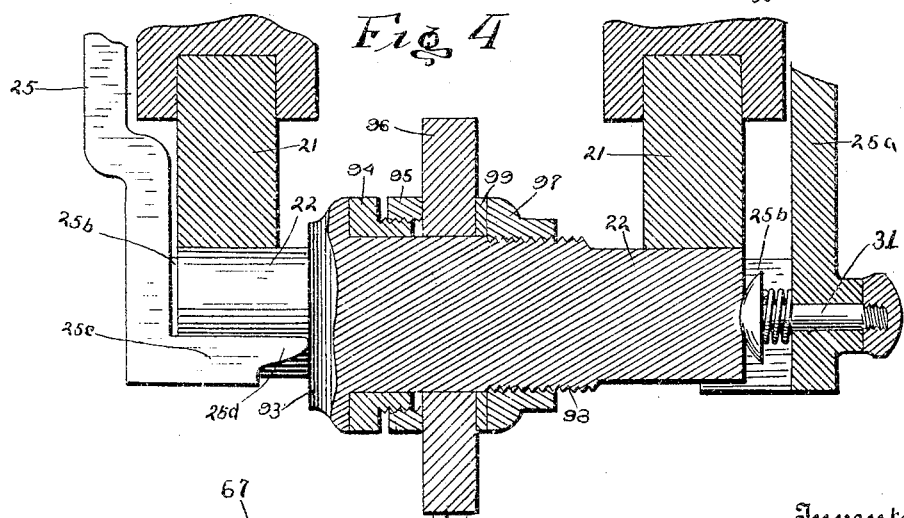

Figs. 4 and 32 illustrate our preferred means of accurately positioning the transfer-roll on its arbor and securing it thereto. In this construction the roll-arbor 22 is provided with a collar 93, formed integral therewith or rigidly secured thereto. A threaded sleeve 94 is positioned on the arbor against said collar, or said sleeve may be formed integral therewith, and a spacing-nut 95, engaging said threaded collar, constitutes one of the clamping-surfaces for securing the transfer-roll 96 on the arbor. A nut 97, engaging a threaded portion 98 of the arbor, provides means for clamping the transfer-roll against the spacing-nut 95, a washer 99 being preferably positioned between said nut 97 and the transfer-roll. By this construction the transfer-roll can be readily and securely clamped with the utmost accuracy in any desired position on its arbor.

A preferred method for accurately determining the proper position of the transfer-roll on its arbor consists in the employment of a disk 149, (shown in broken lines in Fig. 32,) which is slid on the arbor 22 snugly against the shoulder 93, a micrometer-gage being employed to insure accurate adjustment of the roll on its arbor relative to said disk. It is obvious that standard marks could be formed on said disk and transfer-roll for coöperation with the micrometer-gage or that such gage could be adjusted between the contiguous side faces of the roll and disk. It will be seen that the disk 149, from which the roll is accurately positioned, engages the shoulder 94, which is subsequently engaged by the positioning-stops 25ᵃ of the roll-supports, thus providing a construction which insures accurate positioning of the roll in the press. The sleeve 94 and spacing-nut 95 may be provided with a coöperating scale and index for accurately determining the relative position of said two elements, if desired.

Figs. 30, 31, 33, and 34 illustrate an alternative construction which can be substituted for the pointer 62 and index-marks 61 and 64 to permit accurate reading on the part of the operator of the registration of the index-marks and guide-line on the transfer-roll. In this construction a bracket 150, supported from the saddle, is formed with a sleeve 151 for slidably or otherwise supporting a suitable microscopic reading device, the reading device comprising a tube 152, carrying an objective-glass 153 and slidably mounted on a second tube 154, which latter is provided with an eyepiece 155 and with a plain glass 156, having an index-mark 157 and mounted in said tube 154 immediately adjacent a guideway 158 formed therein. An adjustable index-glass 159, provided with an index-mark 160, is secured to the arm 58 of the proportional spacing mechanism in proper position to freely travel in the guideway 158 upon suitable operation of the parts. In the operation of this modified construction the printing-plate, transfer-roll, and pattern are positioned in the press and the index 56 adjusted to the first pattern character, all as previously described. The saddle 23 is then shifted sufficiently to bring the index-marks 157 and 160 into registry. The sleeve 152 is then suitably adjusted to produce a sharp and definite image of the adjacent guide-lines of the transfer-roll on the plain glass 156 and the transfer-roll then turned in its supports until the image of the desired guide-line is superposed on the registered index-marks 157 and 160. During these steps the operator places his eye to the eyepiece 155, which sufficiently magnifies said index-marks 157 and 160 and the image on the plain glass 156 of the desired guide-line to permit a most accurate adjustment thereof. After the parts have been positioned as above described the first character of the desired name or title is impressed in the printing-plate. The index 56 is then adjusted to the second character of the pattern and the operation repeated until the desired name or title has been impressed in the printing-plate.

It will be obvious that any transparent material of suitable thickness may be employed for the index-glasses 156 and 159, if desired.

We have herein described our invention as employed especially in the formation of names and titles upon bank-note plates, or it is obviously adapted for use in numerals or other connections and manners.

Having thus described our invention, what we claim as new, and desire to secure by Letters Patent, is—

1. In an apparatus of the character described, the combination of a primary surface provided with a plurality of characters, a support for a secondary surface for receiving impressions of the desired characters in their required relative arrangement, a pattern of any convenient size indicating the required relative arrangement of the desired characters, a proportional-spacing mechanism, and means constructed for positioning said spacing mechanism to produce a coöperative relation between said mechanism and said pattern, primary surface, and secondary-surface support, substantially as described.

2. In an apparatus of the character described, the combination of a primary surface provided with a plurality of characters, an adjustable support for a secondary surface for receiving impressions of the desired characters in their required relative arrangement, a pattern of any convenient size indicating the required relative arrangement of the desired characters, a proportional-spacing mechanism, and means constructed for positioning said spacing mechanism to produce a coöperative relation between said mechanism and said pattern, primary surface, and secondary-surface support, substantially as described.

3. In an apparatus of the character described, the combination of a primary surface provided with a plurality of characters, a support for a secondary surface for receiving impressions of the desired characters in their required relative arrangement, a pattern of any convenient size indicating the required relative arrangement of the desired characters, a proportional-spacing mechanism, means constructed for positioning said spacing mechanism to produce a coöperative relation between said mechanism and said pattern, primary surface, and secondary-surface support, and means constructed to impress the desired characters on the secondary surface in their required relative arrangement, substantially as described.

4. In an apparatus of the character described, the combination of a primary surface provided with a plurality of characters, a support for a secondary surface for receiving impressions of the desired characters in their required relative arrangement, a pattern of any convenient size indicating the required relative arrangement of the desired characters, a proportional-spacing mechanism, means constructed for positioning said spacing mechanism to produce a coöperative relation between said mechanism and said pattern, primary surface, and secondary-surface support, and means constructed to successively impress the desired characters on the secondary surface, substantially as described.

5. In an apparatus of the character described, the combination of a primary surface provided with a plurality of characters, an adjustable support for a secondary surface for receiving impressions of the desired characters in their relative arrangement, a pattern of any convenient size indicating the required relative arrangement of the desired characters, adjustable proportional-spacing mechanism, means constructed for positioning said spacing mechanism to produce a coöperative relation between said mechanism and said pattern, primary surface, and secondary-surface support, and means constructed to impress the desired characters on the secondary surface in their required relative arrangement, substantially as described.

6. In an apparatus of the character described, the combination of a primary surface provided with a plurality of characters, a support for a secondary surface for receiving impressions of the desired characters in their required relative arrangement, a pattern of any convenient size indicating the required relative arrangement of the desired characters, an adjustable proportional-spacing mechanism, means constructed to lock said adjustable spacing mechanism in its adjusted position corresponding to the proportion between the length of said pattern and the length of the space desired to be occupied by the impressions of the corresponding characters on the secondary surface, and means constructed for positioning said spacing mechanism to produce a coöperative relation between said mechanism and said pattern, primary surface, and secondary-surface support, substantially as described.

7. In an apparatus of the character described, the combination of a primary surface provided with a plurality of characters, an adjustable support for a secondary surface for receiving impressions of the desired characters in their required relative arrangement, a pattern of any convenient size indicating the required relative arrangement of the desired characters, an adjustable proportional-spacing mechanism, means constructed to lock said adjustable spacing mechanism in its adjusted position corresponding to the proportion between the length of said pattern and the length of the space desired to be occupied by the impressions of the corresponding characters on the secondary surface, and means constructed to impress the desired characters on the secondary surface in their required relative arrangement, substantially as described.

8. In an apparatus of the character described, the combination of a primary surface provided with a plurality of characters, a support for a secondary surface for receiving impressions of the desired characters in their relative arrangement, a pattern of any convenient size indicating the required relative arrangement of the desired characters, a proportional-spacing mechanism, means constructed for positioning said spacing mechanism to produce coöperative relation between said mechanism and said pattern, primary surface, and secondary-surface support, means constructed to successively impress the desired characters on the secondary surface, and means constructed to insure a uniform pressure during such successive impressions, substantially as described.

9. In an apparatus of the character described, the combination of a primary surface provided with a plurality of characters, a support for a secondary surface for receiving impressions of the desired characters in their relative arrangement, a pattern of any convenient size indicating the required relative arrangement of the desired characters, a proportional-spacing mechanism, means constructed for positioning said spacing mechanism to produce coöperative relation between said mechanism and said pattern, primary surface, and secondary-surface support, means constructed to successively impress the desired characters on the secondary surface, and adjustable means constructed to insure a uniform pressure during such successive impressions, substantially as described.

10. In a transfer-press, the combination of a transfer-roll provided with a plurality of characters, a support for a secondary surface for receiving impressions of the desired characters in their required relative arrangement, a pattern of any convenient size indicating the required relative arrangement of the desired characters, a proportional-spacing mechanism, and means constructed for positioning said spacing mechanism to produce a coöperative relation between said mechanism and said pattern, transfer-roll, and secondary-surface support, substantially as described.

11. In a transfer-press, the combination of a transfer-roll provided with a plurality of characters on its periphery and with guides on its side registering therewith, a support for a secondary surface for receiving impressions of the desired characters in their required relative arrangement, a pattern of any convenient size indicating the required relative arrangement of the desired characters, a proportional-spacing mechanism, and means constructed for positioning said spacing mechanism to produce a coöperative relation between said mechanism and said pattern, transfer-roll, and secondary-surface support, substantially as described.

12. In a transfer-press, the combination of a transfer-roll suitably supported therein and carrying a plurality of characters and corresponding guides, a pointer carried by said roll-support, a support for a secondary surface, a pattern of any convenient size indicating the required relative arrangement of the desired characters, a proportional-spacing mechanism provided with indices, and means constructed to produce registration of said indices with said pattern, pointer, and roll-guides, substantially as described.

13. In a transfer-press provided with a roll-support, press-bed, and work-chuck, the combination of a transfer-roll carrying a plurality of characters and corresponding guides, a pointer carried by the roll-support, an adjustable proportional-spacing mechanism comprising a member rigidly secured to the press-bed and a pattern-carrying member adjustably supported on said member, and a plurality of indices carried by said spacing mechanism and arranged to be brought into registry, respectively, with said pattern, pointer, and roll-guides, substantially as described.

14. In a transfer-press provided with a roll-support, press-bed, and work-chuck, the combination of a transfer-roll carrying a plurality of characters and corresponding guides, a pointer carried by the roll-support, an adjustable proportional-spacing mechanism comprising a member rigidly secured to the press-bed, a slide member slidably supported thereon, a pattern-carrying member adjustably supported on said first member, a rack slidably supported on said pattern-carrying member, a slide-block pivotally supported on said rack and slidably engaging said slide member, standards carried by said rack, an index carried by said standards and arranged to be brought into registry with a pattern-carrying member, a pointer-arm carried by said slide member and provided with index-marks, and means constructed to adjust said index and index-marks into registry, respectively, with said pattern, pointer, and roll-guides, substantially as described.

15. In a transfer-press provided with the usual beam, head, and bearers, the combination of a saddle slidably supported on said head, means for adjusting said saddle, roll-supports slidably mounted on said saddle and constructed to accurately position a transfer-roll and to normally maintain the same against the bearers, means constructed to lower said roll-supports into position for conveniently receiving the transfer-roll, and means constructed to normally maintain said roll-supports in position with the roll-arbors engaging the bearers, substantially as described.

16. In a transfer-press provided with the usual beam, head, and bearers, the combination of a transfer-roll carried by a shouldered arbor, and roll-supports provided with positioning-stops and with adjustable means constructed to support said arbor with its shoulder in engagement with said stops, substantially as described.

17. In a transfer-press provided with the usual beam, head, and bearers, the combination of a transfer-roll carried by a shouldered arbor, and roll-supports provided with positioning-stops and with adjustable resilient means constructed to normally support said arbor with its shoulder in engagement with said stops, substantially as described.

18. In a transfer-press, the combination of a roll and roll-arbor provided with a collar, a sleeve slidably mounted on said arbor and provided with threads on its outer periphery, a spacing-nut threaded on said sleeve and engaging said roll, and a clamping-nut threaded on said arbor and constructed to clamp the roll against said spacing-nut, substantially as described.

19. In a transfer-press provided with a bed, the combination of a work-chuck supported on said bed and constructed to be tilted through a substantial number of degrees from the horizontal position, said chuck provided with means constructed to permit universal adjustment of the work in any of its positions, substantially as described.

20. In a transfer-press provided with a bed, the combination of a work-chuck supported on said bed, comprising means constructed to vary the elevation of the work, means constructed to tilt the work from a horizontal position, means constructed to rotate the work, and means carried by said rotating means and constructed for universal adjustment of the work in a single plane, substantially as described.

21. In a transfer-press provided with a bed, the combination of a work-chuck supported on said bed and comprising coöperating wedges constructed for varying the elevation of the work, a member tiltably supported on said wedges, a member rotatably supported on said tiltable member, a laterally-adjustable member slidably mounted on said rotatable member, and a longitudinally-adjustable member slidably mounted on said laterally-adjustable member, substantially as described.

22. In a transfer-press provided with a bed, the combination of a work-chuck supported on said bed, and comprising coöperating wedges constructed for varying the elevation of the work, a member tiltably supported on said wedges, a member rotatably supported on said tiltable member, a laterally-adjustable member slidably mounted on said rotatable member, and a longitudinally-adjustable member slidably mounted on said laterally-adjustable member and constructed for adjustment in a direction perpendicular to the adjustment of said laterally-adjustable member, substantially as described.

In testimony whereof we affix our signatures in presence of two witnesses.

JOHN R. HILL.
JOHN A. SVENSSON.

Witnesses for John R. Hill:
    EVAN S. STOKES,
    C. W. GOOD.
Witnesses for John A. Svensson:
    EDWIN A. SITSAINT,
    JAMES B. HANEY.